May 15, 1962 P. S. LEDERER 3,034,332
STEP FUNCTION PRESSURE CALIBRATOR
Filed Nov. 30, 1960 2 Sheets-Sheet 1

INVENTOR
PAUL S. LEDERER

BY
AGENT
ATTORNEYS

United States Patent Office 3,034,332
Patented May 15, 1962

3,034,332
STEP FUNCTION PRESSURE CALIBRATOR
Paul S. Lederer, Silver Spring, Md., assignor to the United States of America as represented by the Secretary of the Navy
Filed Nov. 30, 1960, Ser. No. 72,814
9 Claims. (Cl. 73—4)
(Granted under Title 35, U.S. Code (1952), sec. 266)

The invention described herein may be manufactured and used by or for the Government of the United States of America for governmental purposes without the payment of any royalties thereon or therefor.

The present invention relates to a device for calibrating pressure pick-ups, or as more commonly referred to, pressure transducers, and more particularly to a device for calibrating pressure pick-ups in which the entire transient response of the pick-up may be displayed.

Prior to the instant invention, there has heretofore never been a device devised for calibrating pressure pick-ups which permitted the individual calibrating the pressure pick-up to observe or photograph a complete display of the pick-up's transient response on an oscilloscope.

Devices have been employed wherein the display on the oscilloscope shows only the peak or maximum magnitude of the pressure being applied to the pressure pick-up being calibrated. The primary reason for this being that the interval of time between the instant of pressure application to the pick-up and the time required for the pressure to reach its peak value when acting on the pick-up is less than the interval of time between the sending of the pressure signal to the oscilloscope and its actual display on the screen, therefore, the display on the screen usually shows only the pressure signal at its peak or maximum value. Devices of this type do not give any indication as to the manner in which the pressure pick-up responds in the lower pressure regions. Such a device merely gives an indication of the pressure pick-up's response to the peak or maximum pressure and falls short of meeting the optimum features desired in such a device.

Also, it has been found desirable for a device of this type to be capable of supplying pressure to the pick-up almost instantaneously without any pressure drop in the supply line. Such a requirement is dictated by a desire to try to simulate the actual conditions to which the pressure pick-up may be exposed when employed in field or laboratory use.

In addition, it is very desirable to have a device wherein the pressure may be applied to the pick-up for any desired length of time. The advantage of this feature would be to enable one to determine the manner in which the pick-up would respond when subjected to a given pressure for an extended period of time.

Due to the many applications of presently used pressure pick-ups, for example, telemetering, testing, etc., it is of prime importance that the pressure pick-ups are fully reliable or as near to being fully reliable as possible, with regard to all pressure ranges, the lower pressure areas as well as their peak or maximum operating pressures and also their transition pressures.

An object of the present invention is the provision of an easily assembled device that is relatively inexpensive and is suitable for both static and dynamic calibrations of many types of pressure pick-ups.

A further object of the invention is the provision of a device which applies an accurately known positive going step function of air pressure to the pick-up being calibrated.

Another object of the invention is to provide a device which permits the applied pressure to be applied almost instantaneously and also permits the application of this pressure for any desired length of time.

Another object of the invention is to provide a device which enables the individual calibrating the pressure pick-up to observe the entire transient response of the pressure pick-up being calibrated on an oscilloscope.

Other objects and many of the attendant advantages of this invention will be readily appreciated as the same becomes better understood by reference to the following detailed description when considered in connection with the accompanying drawings wherein.

Figure 1:
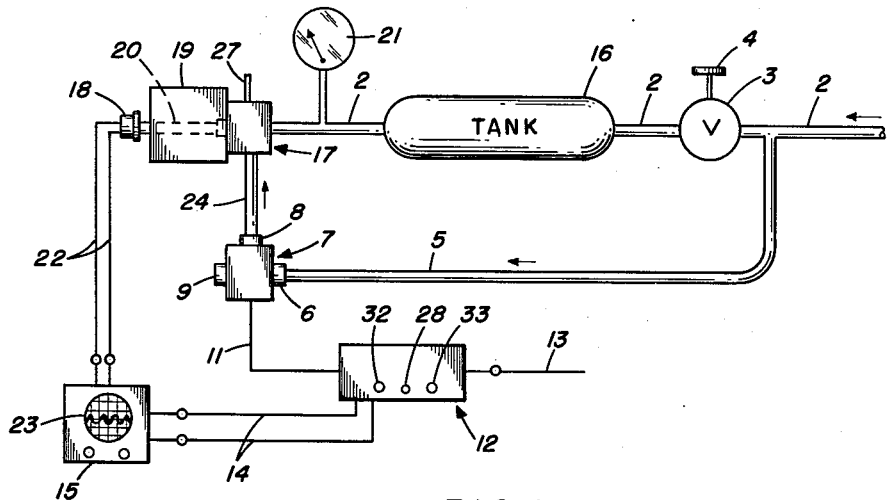
FIG. 1 shows a schematic layout of a preferred embodiment of the invention.
Figure 3:
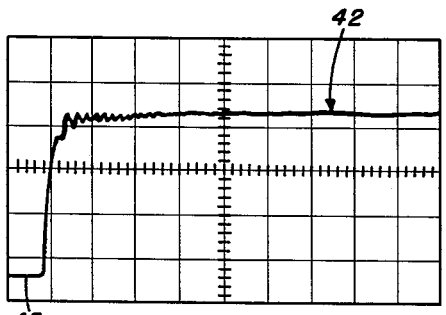
Figure 4:
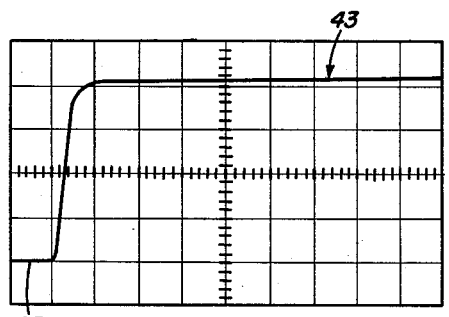
Figure 5:
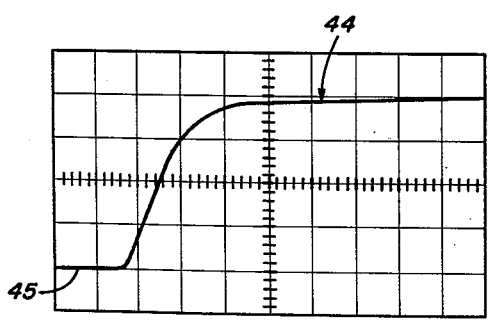

FIGS. 3, 4, and 5 illustrate the various types of oscilloscope displays obtainable with the device shown in FIG. 1.

Referring now to the drawings, wherein like reference characters designate like or corresponding parts throughout the several views, there is shown in FIG. 1, which illustrates a preferred embodiment, a compressed air line 2 (source not shown) supplying air under pressure to an air pressure regulator 3. Regulator 3 being manually adjustable to any desired pressure by means of control valve 4. The pneumatic pressure regulator 3 may be of any suitable type available commercially, on the open market.

Upstream of the pressure regulator 3 there is a by-pass line 5, tapping air off line 2, which supplies air under pressure to valve 7 which is a commercial solenoid-operated quick opening three-way valve. Valve 7 is obtainable on the open market under the trade name of "Humphrey," model #200E-2. This valve 7 is provided with an air pressure inlet 6, an outlet 8 and a vent 9 opening to the atmosphere. When the solenoid is energized by the proper switch, air inlet 6 and outlet 8 are both closed and the atmospheric vent 9 is opened. Solenoid-operated valve 7 is provided with an electrical connection 11 which supplies it with the necessary current for its operation. The electrical connection 11 leads to the control chassis 12, which will be described in greater detail below. The control chassis 12 is supplied with 117 volt alternating current via the power line 13, the source not shown.

Control chassis 12, addition to having an electrical connection 11 to solenoid valve 6, is provided with a triggering signal output 14 which energizes the oscilloscope 15 starting its sweep.

Downstream of air pressure regulator 3 is an air storage tank 16 which is connected thereto by line 2. The volume of the air storage tank 16 is considerably larger (at least 100 times) than the combined internal volumes of pneumatic valve 17, pressure pick-up 18, and the mounting fixture well 20.

Air storage tank 16 is connected to a pilot operated pneumatic quick-opening valve 17 by means of pressure line 2. This valve 17 is also commercially available on the open market under the trade name of "Humphrey," model #300FX. Intermediate the quick-opening valve 17 and the air storage tank 16 there is a conventional precision dial pressure gauge 21 which accurately registers the pressure being supplied to the pressure pick-up 18 via line 2.

Quick-opening valve 17 is mounted on one end of the fixture 19. Inserted through the other end of the fixture 19 is the pressure pick-up 18 which is provided with connection 22 for transmitting its output signal to the oscilloscope 15. As pointed out above, valve 17 is a pilot operated pneumatic valve and is supplied with actuating air pressure via line 24.

Valve 17 is also interconnected with solenoid operated valve 7 via line 24 and is opened by the pressure received through line 24 and permits the pressure in storage tank 16 to act on the pressure pick-up 18 which is mounted within the fixture 19. Each of the valves 7 and 17, although being actuated in a different manner, is a three-way valve, i.e., an inlet, outlet, and a vent to atmosphere the vents being indicated by numerals 9 and 27 for valves 7 and 17, respectively. When the valves are in their closed position with regard to the air under pressure, the vent to atmosphere is opened and when the valves are actuated, the atmospheric vents 9 and 27 are closed.

Figure 2:
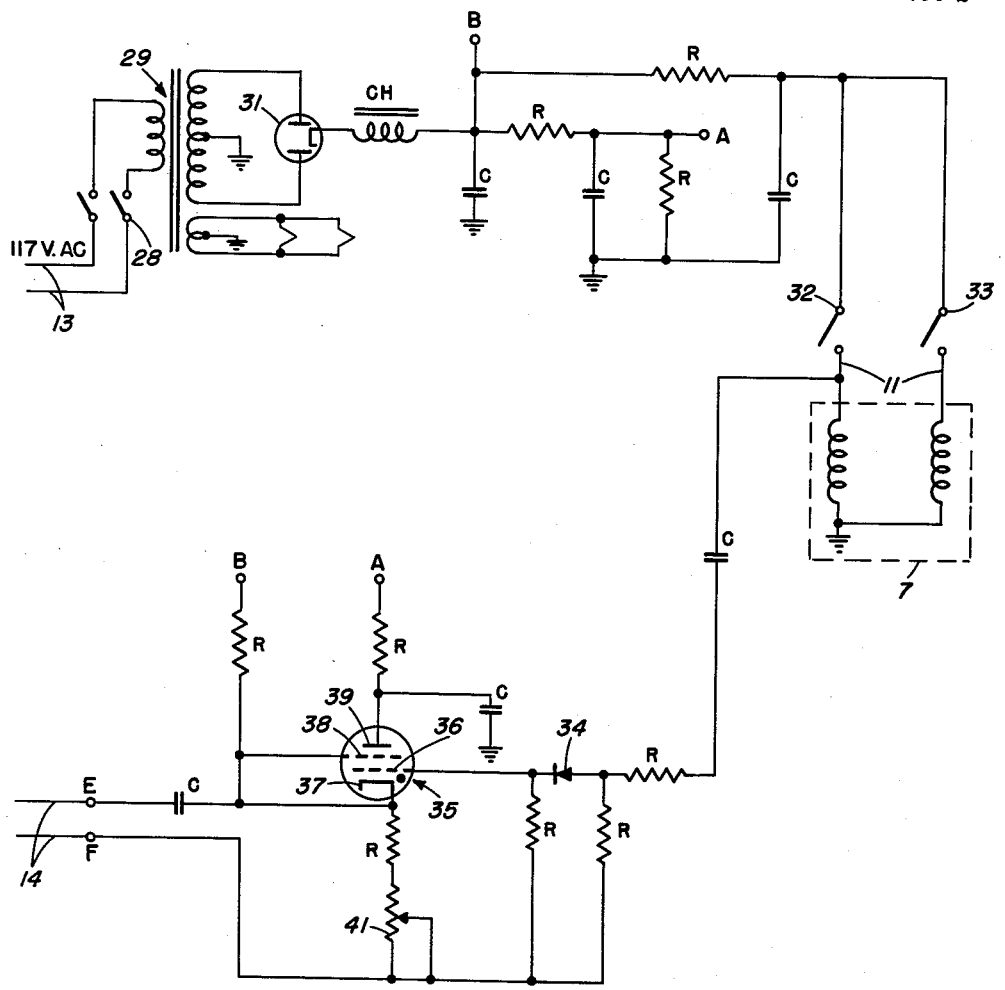
FIG. 2 illustrates an embodiment of the electrical circuit employed in the control chassis of FIG. 1.

FIG. 2 is a wiring diagram for the control chassis 12. A function of the control chassis 12 is to provide control over the solenoid-operated valve 7 which in turn actuates pneumatic valve 17 admitting air under pressure to the pressure pick-up 18. Another function of the control chassis 12, this being the most important function of the control chassis 12, is to transmit a triggering signal to the oscilloscope 15 to start the sweep of the cathode ray oscilloscope. This signal to the oscilloscope 15 is transmitted simultaneously with the signal sent to the solenoid-operated valve 7. By so doing, the oscilloscope 15 is energized a slight interval of time prior to the opening of pneumatic valve 17. This interval of time being approximately six milliseconds and of sufficient length to permit the oscilloscope 15 to be fully warmed up and start its sweep prior to the pressure in the tank 16 acting on the pick-up 18.

In the wiring diagram shown by FIG. 2 there is shown a 117 volt alternating current input 13 to the control chassis 12. The input is controlled by an off-on switch 28 supplying current to input transformer 29 which is connected to a full wave rectifying tube 31 and its associated filtering network which includes a choke, plurality of capacitors, resistors, as denoted by characters CH, C, R, respectively, and provides a direct current output across terminals A and B. Connected to the D.C. output are a pair of single-pole, single-throw momentary contact switches 32 and 33. Switch 32 closes the circuit energizing the solenoid valve 7 to permit air pressure to flow therethrough and switch 33 cuts off the flow of air pressure therethrough and opens vent 9 to atmosphere.

As can readily be seen from the wiring diagram, closing switch 32 also provides a flow of current through a capacitor C, resistor R to the selenium rectifier 34 which in turn supplies current to gas tube 35. Gas tube 35 may be any well known commercially available gas tube with a control grid 36, cathode 37, screen grid 38 and a plate 39. It is to be noted that terminals A and B which are connected to the gas tube 35 are to be connected to terminals A and B, respectively, of the filtering network. The connection was not shown to avoid any confusion which might result from the crossing of the leads. Also connected to the gas tube 35 is a variable resistor 41 and output terminals E and F which provide the triggering signal for the oscilloscope 15 via leads 14 as shown in FIG. 1.

FIGS. 3, 4, and 5 show several typical pressure signals 42, 43, and 44, as presented on the oscilloscope screen 23. Signals 42, 43, and 44 each show the ezro trace 45 which was displayed prior to the application of pressure to the pick-up 18. Also shown is the amplitude of the signal which may be converted into pounds per square inch by applying known conversion factors and thus permitting a comparison with a reading of the precision dial pressure gauge 21.

If it is desired to study the response of the pressure pick-up 18 from zero psi to the maximum pressure applied, it can readily be accomplished by varying the horizontal sweep of the oscilloscope 15, as was done to the signal 44 illustrated in FIG. 5. With a blown up view of this region, any competent person can readily evaluate the response of the pressure pick-up 18 and determine whether or not it is functioning properly and then calibrate the pick-up 18, if found necessary.

Assuming all the necessary connections are made as shown in FIG. 1, the operation of the device is as follows: air under pressure is supplied via line 2 to the regulating valve 3, which may be set to any desired value less than that of compressed air source, which in turn supplies the air storage tank 16. The downstream side of air storage tank 16 is connected to pneumatic valve 17 by means of line 2.

A by-pass line 5 is connected to line 2 upstream of pressure regulator 3 and supplies air to solenoid operated valve 7. Valves 7 and 17 are interconnected by line 24. Valve 17 is fixedly secured to mounting fixture 19 which also provides support for the pressure pick-up 18 by means of a well 20 which receives pick-up 18.

Valve 7 is electrically connected to the control chassis 12 via connection 11. Control chassis 12 receives 117 volt alternating current via connection 13 and in addition to output 11, it is provided with a signal output 14 which is transmitted to oscilloscope 15. Oscilloscope 15 is also connected to the pressure pick-up 18 via lines 22 in order that the pressure signal may be viewed on the oscilloscope screen 23.

At this point, the outlet 8 of solenoid valve 7 is closed and atmospheric vent 9 is open. The outlet of valve 17 leading to the pressure pick-up is closed and the vent 27 to the atmosphere is open. When the switch 28 is placed in the "on" position, current is supplied to the control chassis 12 and permits the tubes to heat up. The oscilloscope 15 is plugged into a proper power supply (not shown).

With all the necessary connections made, storage tank 16 charged and proper photographing means at the oscilloscope (if a permanent record is desired), the device is ready to receive the signal output of the pressure pick-up 18 for display on the oscilloscope screen 23. The momentary contact switch 32 is depressed supplying current to the solenoid valve 7 and simultaneously sending a triggering signal to the oscilloscope 15. As the solenoid valve 7 opens, it simultaneously closes atmospheric vent 9 and supplies air under pressure to pneumatic valve 17 which opens the line 2 interconnecting the storage tank 16 with the pressure pick-ups 18. As this connection was made, the atmospheric vent 27 simultaneously closed.

Since the volume of air storage tank 16 is so much greater than the combined internal volume of valve 17, the fixture well 19 and the pressure pick-up 18 and because the action of valve 17 is so rapid, the pressure at the pick-up reaches its full value in less than two milliseconds without any pressure drop.

It is to be noted that the pressure will continue to be applied to the pick-up 18 until the momentary contact switch 33 is depressed whereby the solenoid valve 7 is brought into its closing position cutting off the supply of air to valve 17. Once the air supply of valve 17 is cut off, the valve 17 will return to its closed position and open atmospheric vent 27. Now the pressure pick-up 18 may be removed and a new pick-up inserted into the well 20. It will be observed that the pressure to pick-up 18 continues until momentary contact switch 33 is depressed. The purpose of this feature is to permit a close analysis of the response of the pick-up 18 when it is subjected to its maximum pressure for an extended period of time.

In analyzing the advantages of the present device, it becomes apparent that here is provided a device which enables one to accurately calibrate and study the response of pressure pick-ups. The device is also capable of being made portable and may be very easily modified for field use. The size of the air storage tank employed provides instantaneous pressure application to the pick-up without any significant pressure drop. In summation, it is interesting to note that the present invention has provided a device which serves many useful functions in regard to the calibration of pressure pick-ups filling a present day need.

Obviously many modifications and variations of the present invention are possible in the light of the above teachings. It is therefore to be understood that within the scope of the appended claims, the invention may be practiced otherwise than as specifically described.

What is claimed is:

1. An apparatus for calibrating a pressure pick-up comprising, a mounting fixture having a well for receiving said pressure pick-up, a fluid pressure system and an oscilloscope operatively connected to said pressure pick-up, a first and second three-way valve in said fluid pressure system for controlling the flow of fluid pressure therethrough, a precision gauge operably mounted in said pressure system, an electrical control chassis which is connected to said fluid pressure system and said oscilloscope, said control chassis operable to simultaneously transmit an actuating signal to the first of said three-way valves admitting fluid under pressure to said second three-way valve which controls the admission of pressure to said pick-up and also a triggering signal to said oscilloscope permitting said oscilloscope to begin its sweep prior to the application of pressure to said pick-up whereby a full display indicating the response of pick-up is presented on the oscilloscope screen.

2. In an apparatus for calibrating a pressure pick-up as described in claim 1 wherein said fluid pressure system includes a pressure regulator and an air storage tank connected in series with said precision gauge and controlling the fluid pressure being supplied to said second three-way valve and a by-pass line in which said first three-way valve is installed.

3. In an apparatus for calibrating a pressure pick-up as described in claim 1 wherein said fluid pressure system includes a pressure regulator, an air storage tank and a pressure gauge connected in series and controlling the fluid pressure being supplied to said second three-way valve and a by-pass line in which said first three-way valve is inserted.

4. In an apparatus for calibrating a pressure pick-up as described in claim 1 wherein said first three-way valve is a solenoid operated valve that is energized by said control chassis and remains in its open position until said control chassis energizes said solenoid in the opposite direction closing the inlet of said first valve and cutting-off the pressure being applied to said pick-up whereby an analysis of the pressure pick-up's response after an extended period of pressure application may be made.

5. In an apparatus for calibrating a pressure pick-up as described in claim 4 wherein said second three-way valve is a pilot operated pneumatic valve which receives its actuating pressure from said by-pass line when said first three-way valve is in open position.

6. In an apparatus for calibrating a pressure pick-up as described in claim 2 wherein said air storage tank has an internal volume exceeding the combined internal volumes of said second three-way valve, said pressure pick-up and said mounting fixture well by a factor of 100, permitting said fluid pressure to act on said pick-up almost instantaneously without any significant drop in line pressure.

7. In an apparatus for calibrating a pressure pick-up, a fluid pressure system operatively connected to said pressure pick-up, a precision gauge operably mounted in said fluid pressure system, and oscilloscope means connected to said pressure pick-up for displaying the signal received therefrom in response to changes in applied pressure, the improvement comprising a fluid pressure system including a first, second, and third valve means for controlling the application of pressure to said pressure pick-up, a by-pass line around said third valve means and said air storage tank, an electrical control chassis for simultaneously energizing said first valve means and transmitting a triggering signal to said oscilloscope means to start the sweep of the oscilloscope prior to the application of fluid pressure to said pressure pick-up whereby a full display of the pick-up's response is presented on the screen of said oscilloscope.

8. In an apparatus for calibrating a pressure pick-up as described in claim 7 wherein said first valve means is a solenoid operated three-way valve controlling the supply of pressure to said second valve means, said second valve means is a pilot operated pneumatic valve which responds to the pressure being supplied by said by-pass line and said third valve means is a manually adjustable pressure regulator.

9. In an apparatus for calibrating a pressure pick-up comprising a mounting fixture having a well therein, said pressure pick-up fixedly secured to said mounting fixture well, a fluid system operatively connected to said pressure pick-up, an oscilloscope operably connected to said pick-up to receive the pressure change signals produced by said pick-up, said fluid pressure system including a pressure regulator, a fluid pressure storage tank, a precision gauge and a pilot-operated valve, each of said components mounted in series and capable of permitting flow therethrough, a by-pass line by-passing each of said components and supplying pressure to a solenoid-operated valve, said solenoid-operated valve controlling the supply of actuating pressure to said pilot-operated valve, an electrical control chassis operably connected to said solenoid-operated valve supplying current thereto and simultaneously sending a triggering signal to said oscilloscope whereby the sweep of said oscilloscope begins prior to the application of pressure to said pressure pick-up due to the difference between the interval of time between the opening of said solenoid-operated valve and the application of pressure to said pick-up and the interval of time between the sending of said triggering signal to said oscilloscope and the receiving of said triggering signal.

References Cited in the file of this patent

UNITED STATES PATENTS 2,539,418    Grogan _____ Jan. 30, 1951